Aug. 31, 1943.  J. J. NEUMAN  2,328,394
FULL AUTOMATIC CENTRIFUGAL EXTRACTOR MACHINE
Filed Dec. 14, 1938  10 Sheets-Sheet 7
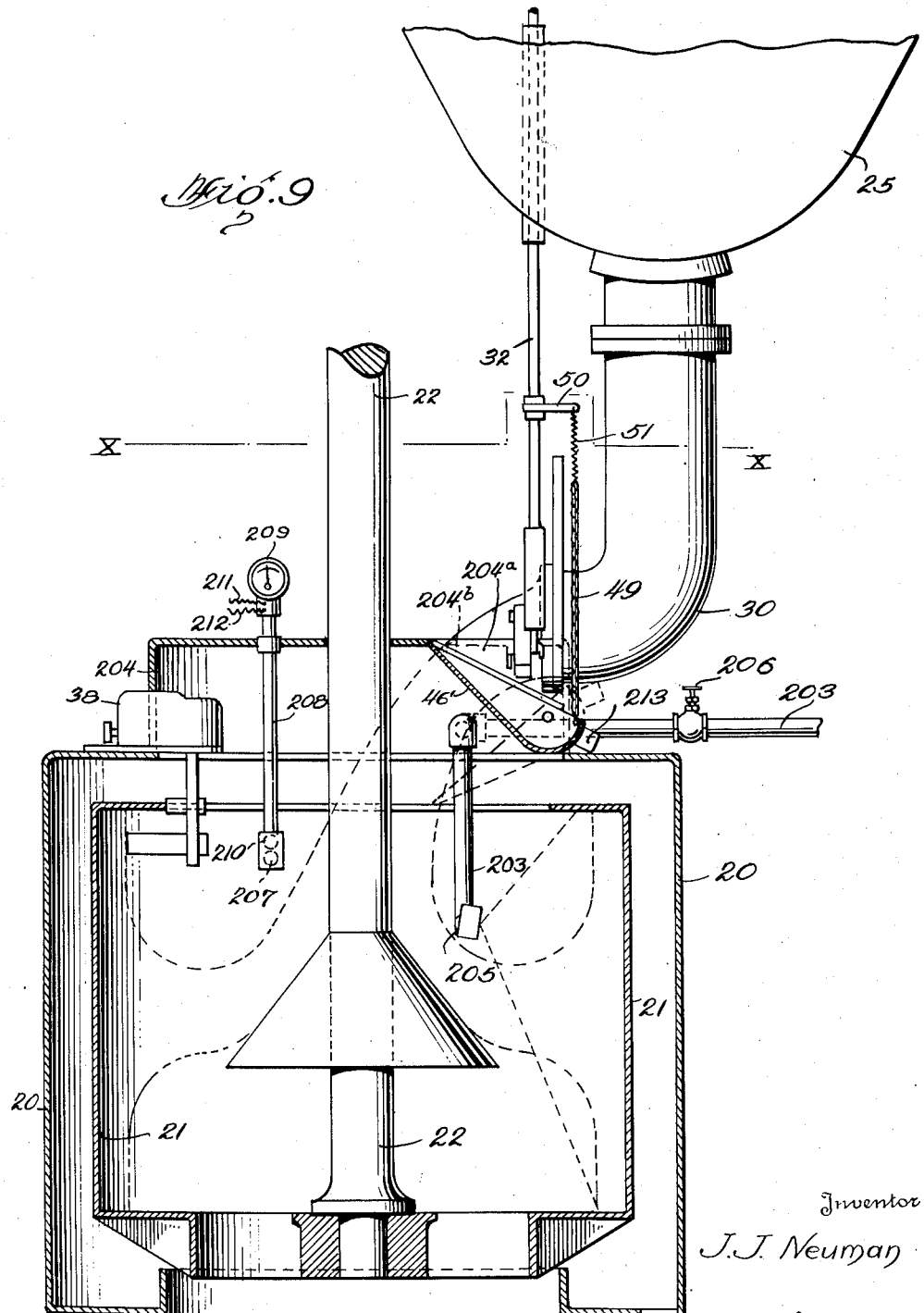
Inventor
J. J. Neuman
C. P. Goepel
Attorney Aug. 31, 1943.   J. J. NEUMAN   2,328,394
FULL AUTOMATIC CENTRIFUGAL EXTRACTOR MACHINE
Filed Dec. 14, 1938   10 Sheets-Sheet 8
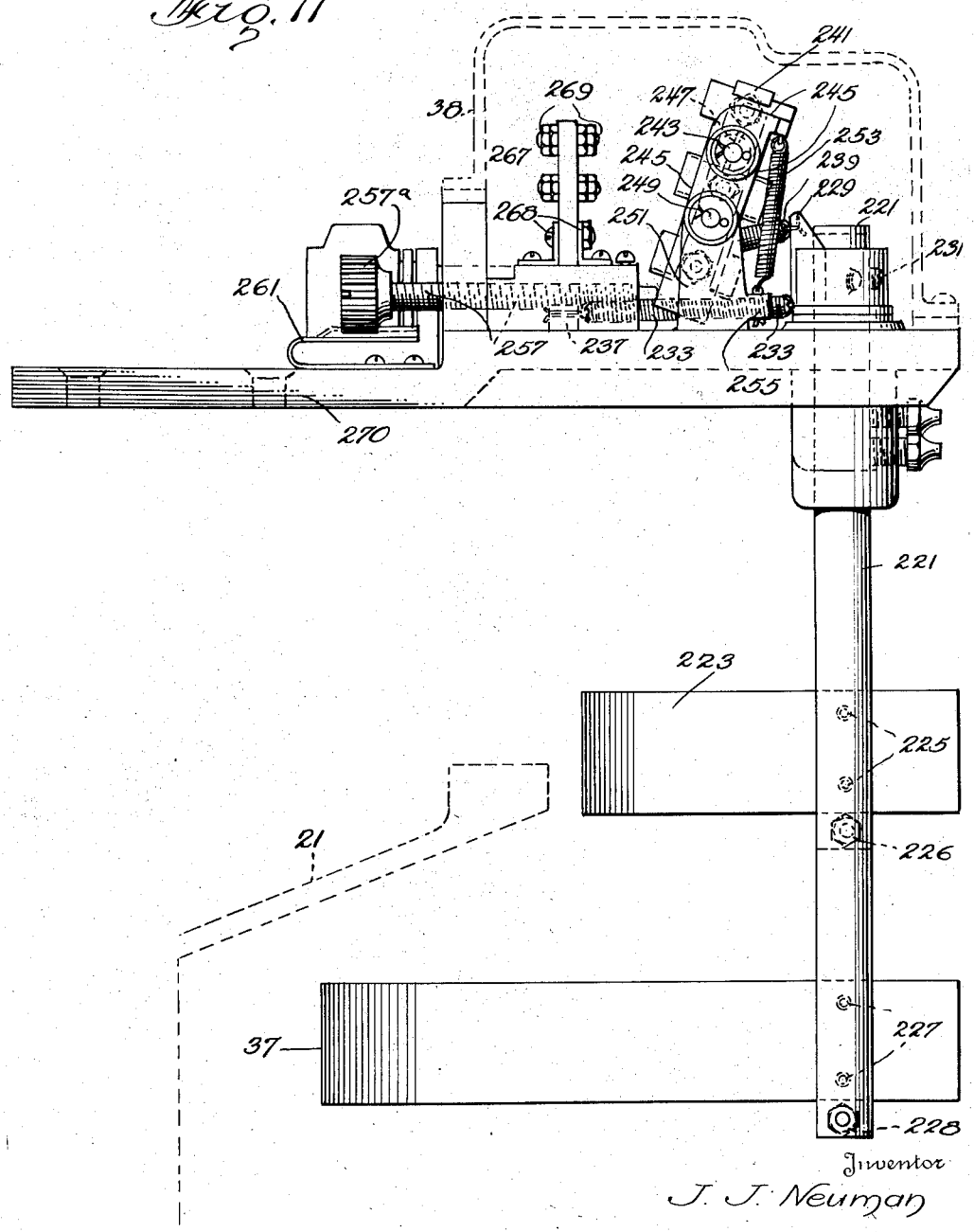

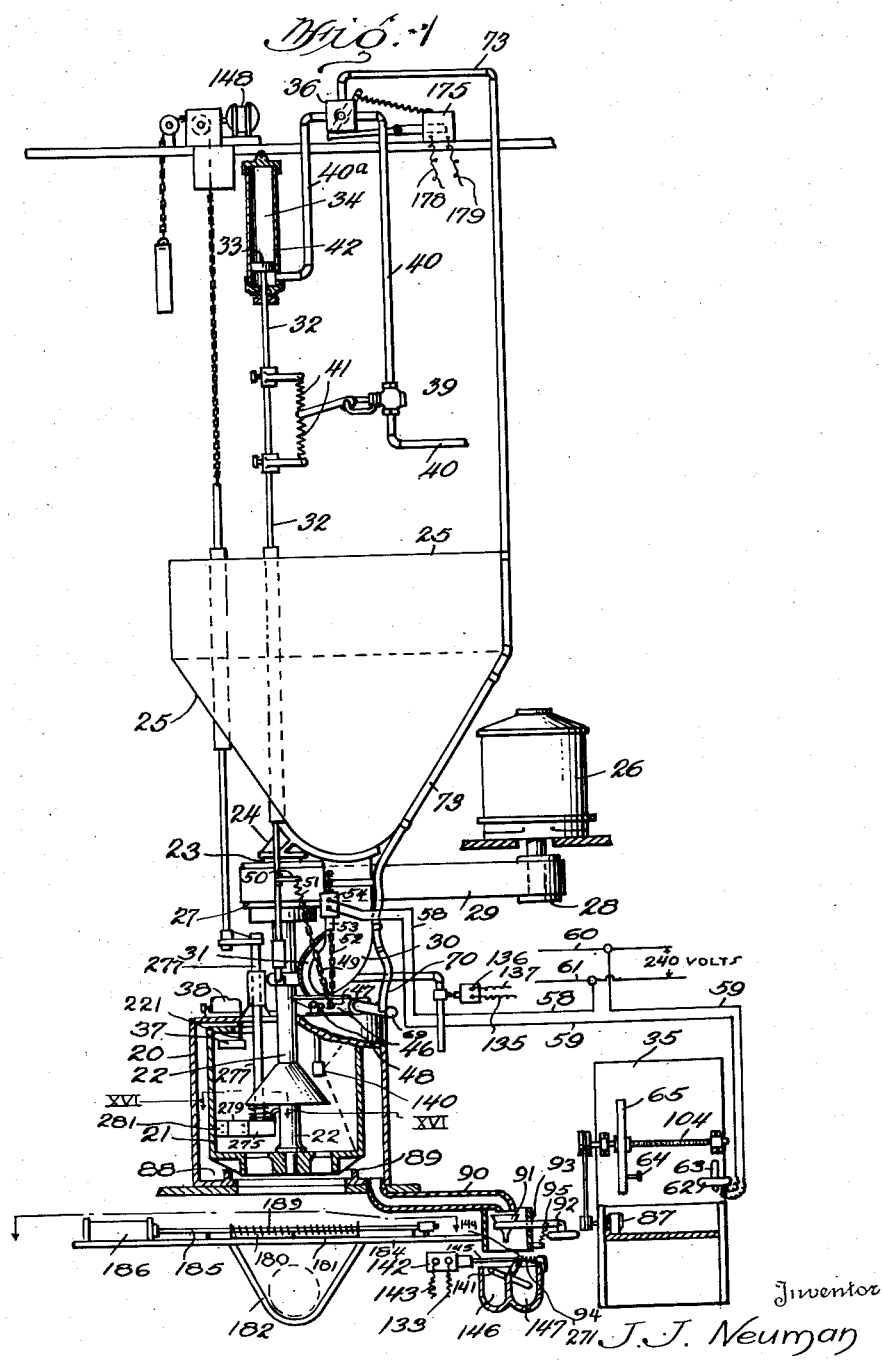

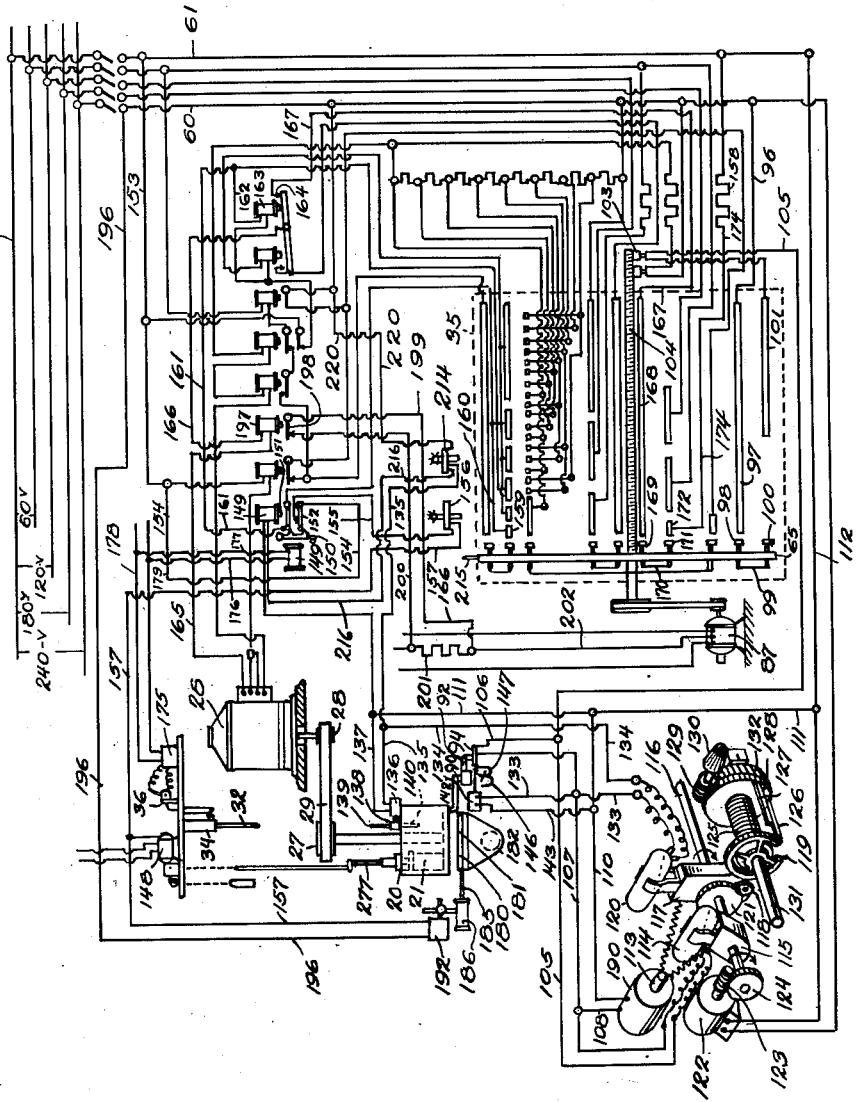

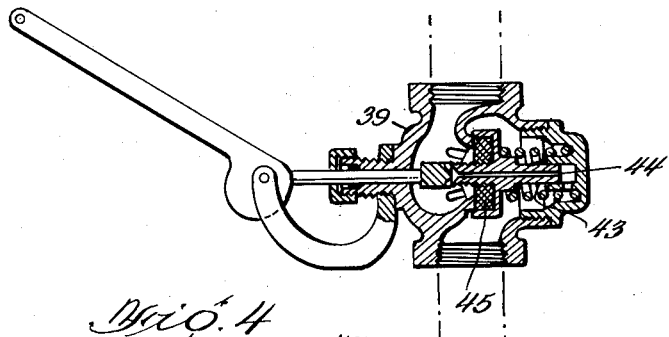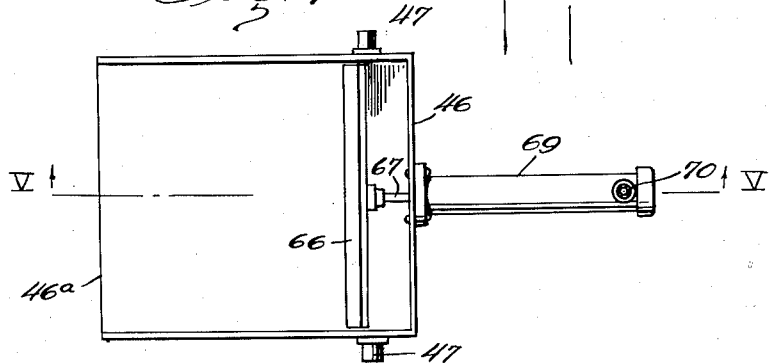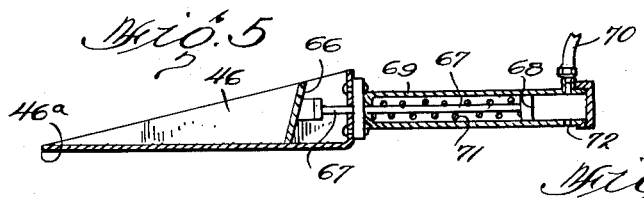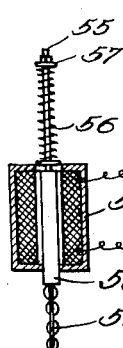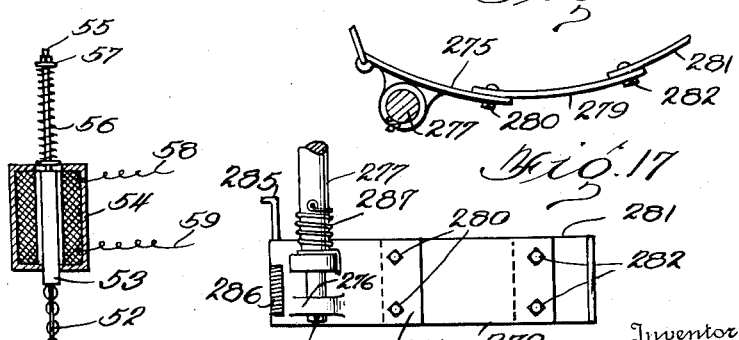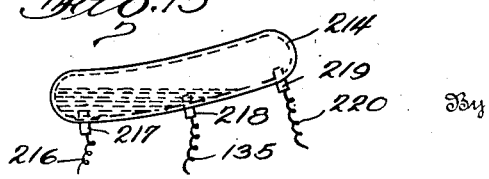

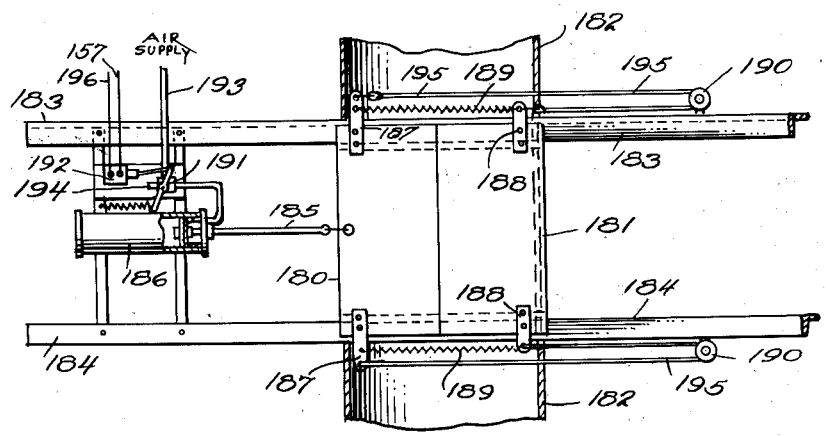
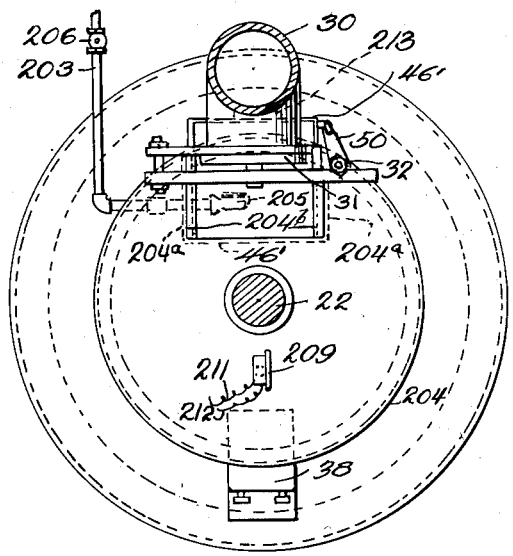

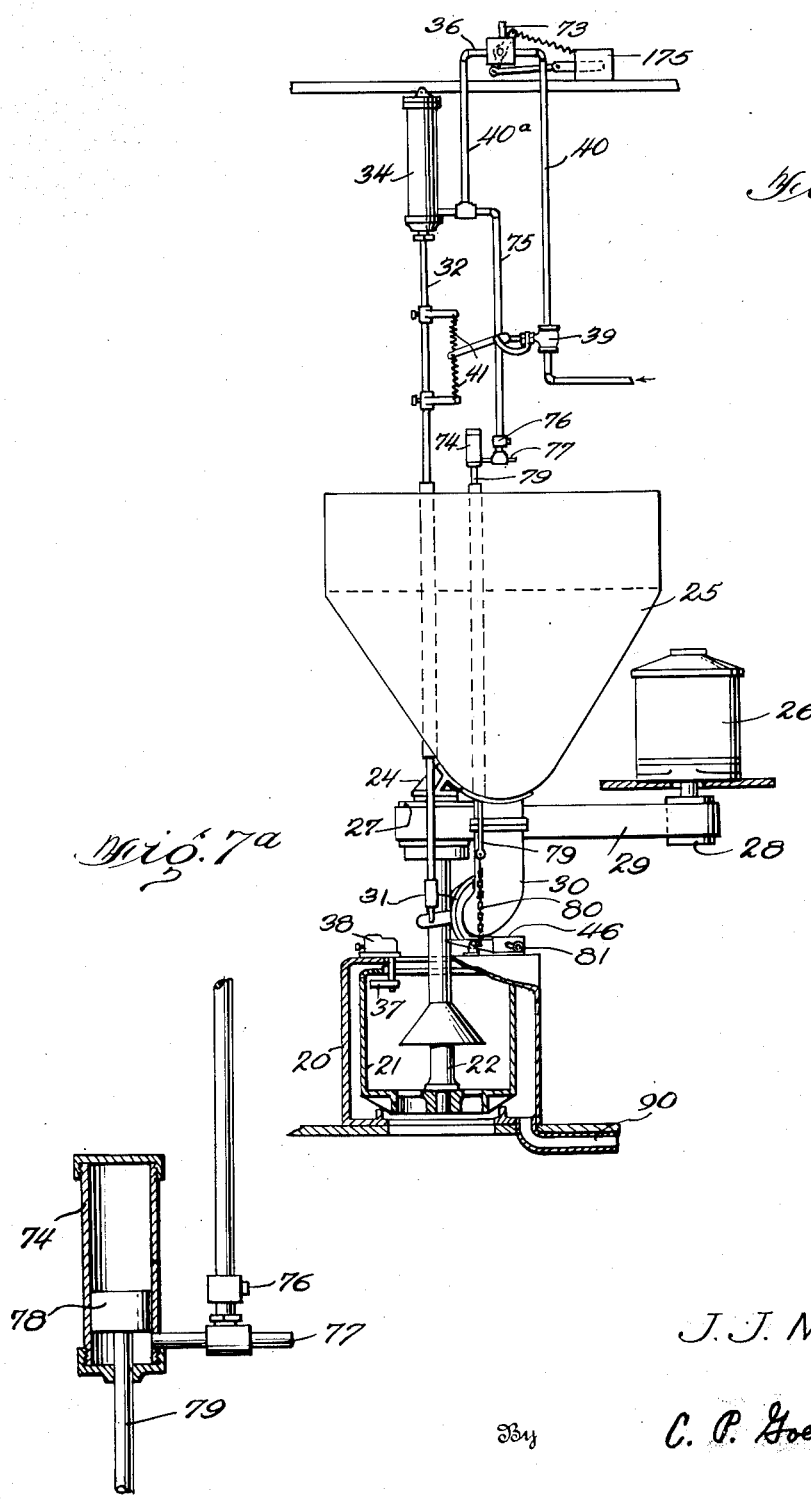

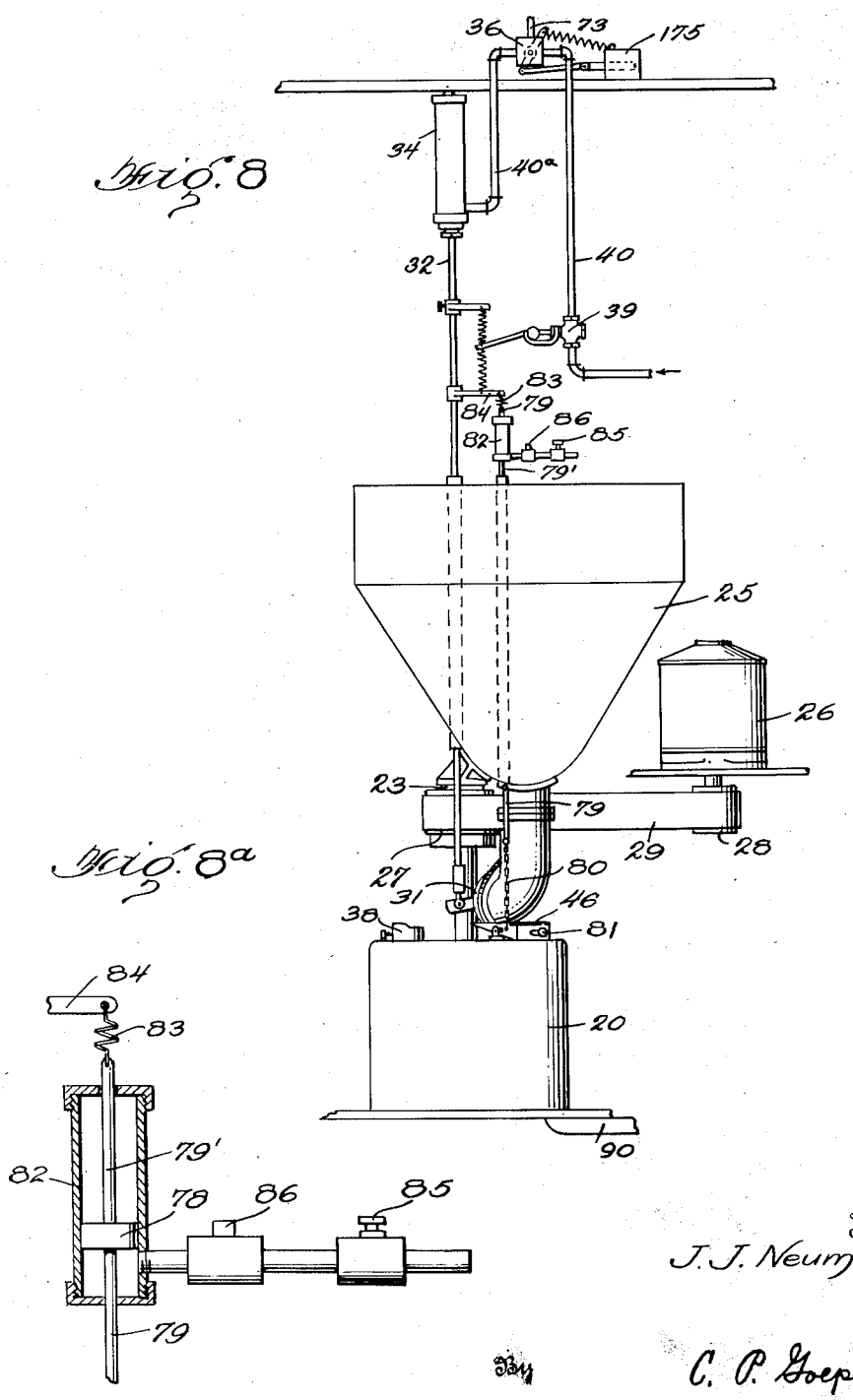

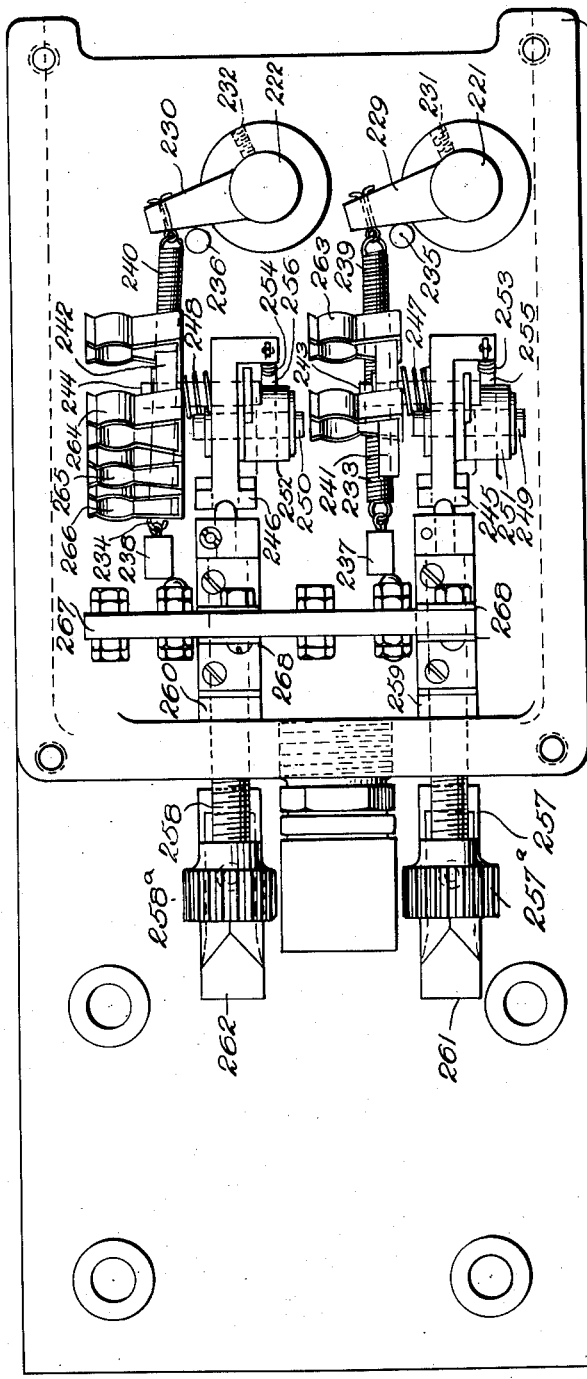

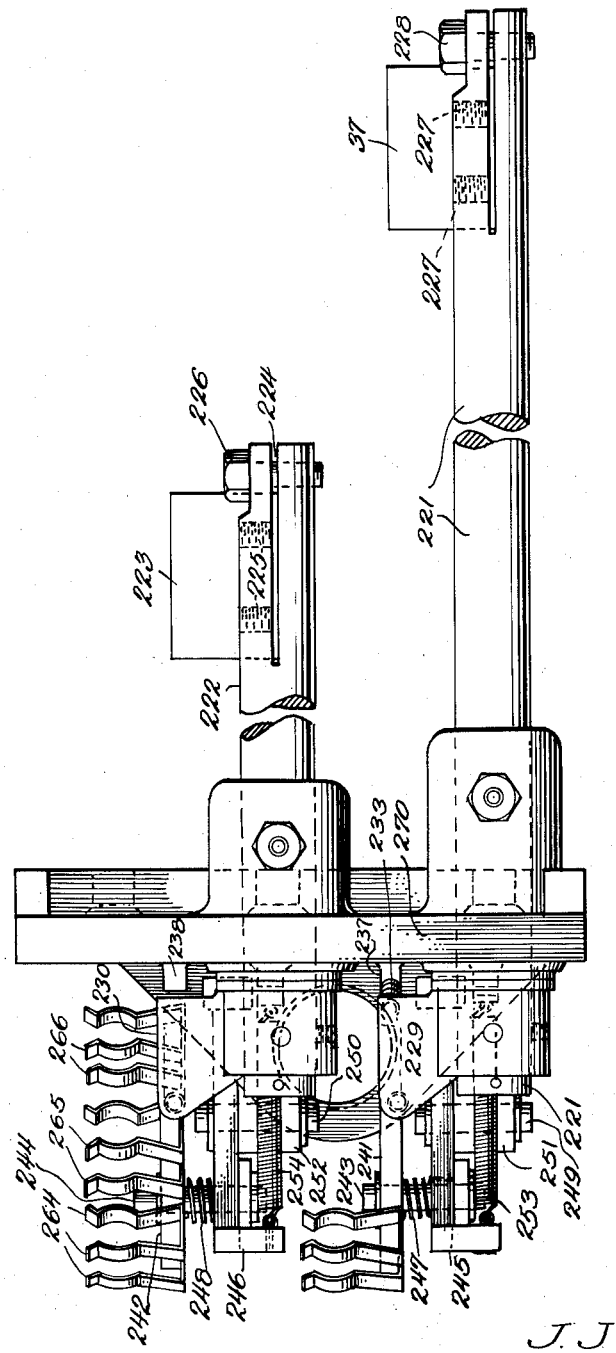

Patented Aug. 31, 1943

2,328,394

UNITED STATES PATENT OFFICE 2,328,394

FULL AUTOMATIC CENTRIFUGAL EXTRACTOR MACHINE

Jacob J. Neuman, South Salem, N. Y.

Application December 14, 1938, Serial No. 245,790

23 Claims. (Cl. 210—72)

The present invention relates to full automatic centrifugal extractor machines, and more particularly to a centrifugal used for separation of liquids from a magma consisting of a mixture of liquors and crystals of sugar, salt or the like.

It is a primary object of this invention to add certain improvements and new features to the automatic centrifugal extractor controls, apparatus and other equipment disclosed in my patents: Re. No. 17,378, 1,921,446, 1,922,629, 1,939,183, 1,946,725, 2,077,053, 2,090,373; and copending applications Serial No. 135,879, filed April 9, 1937; Serial No. 164,115, filed September 16, 1937; Serial No. 229,084, filed September 9, 1938; such improvements and additions being mainly for the purpose of raising efficiency and reducing supervisory duties by providing safe guards to production quality and operating efficiency.

The purpose of one such improvement is to provide means to maintain the current in the extractor driving motor relatively constant for the purpose of assuring constant rates of acceleration and deceleration thus utilizing the maximum power rating and efficiency of the motor during these periods and at the same time not exceeding rated values.

Another important object of the invention is to provide a series of means for assuring more positive operation of the various other functions of the machine such as the operations of charging, discharging, washing and to assure greater uniformity of the product delivered by the extractor regardless of certain inherent variables and variations in the quality and consistency of the material delivered to said extractor machine.

Another object is to provide automatic safeguards for arresting certain functions of the machine when the preceding function has not been performed due to causes such as mechanical or electrical failure of the control equipment.

A further object is to provide means for assuring a more nearly complete separation of the liquor from the sugar crystals by totally enclosing the machine and introducing steam or water vapor to maintain a humid atmosphere in the machine, thus preventing the liquor from drying and adhering to the crystals before the machine reaches a speed at which the centrifugal force is sufficient to effect the separation.

A still further object is to provide means for automatically applying the wash water at the correct instant regardless of variations in the raw product being processed and to separate the heavy molasses extracted by the machine from the higher grade sugar syrup.

Another object is to provide means for indicating the efficiency with which the liquor is being purged from the crystal by gauging the color of the crystals in the basket.

With the foregoing and other objects in view as will become apparent from the following drawings and description the present invention will be more specifically pointed out and subsequently incorporated in the subjoined claims, it being understood that only such parts of the control means disclosed in my above identified prior patents and copending applications which directly relate to the present invention, are herein illustrated.

In the drawings wherein like characters of reference refer to like or corresponding parts throughout the several views.

Figure 1 is an elevation partly in section of a full automatic centrifugal extractor machine showing the apparatus for performing the various functions of charging, acceleration, application of wash water, separation of extracted liquor, deceleration and discharging.

Figure 2 is a schematic wiring diagram showing the circuits for the control of the various apparatus associated with the extractor of Figure 1.

Figure 3 is a detailed section of the air valve for controlling the charging of the extractor.

Figure 4 is a plan view of the self-cleaning drip pan used in conjunction with the charging gate.

Figure 5 is a section on the line V—V of Figure 4.

Figure 6 is a plan view of the automatic gates under the extractor taken substantially on the line VI—VI of Figure 1.

Figure 7 is an alternate embodiment of the means of control for the drip pan under the charging gate.

Figure 7a is a detailed vertical section through the device for tilting the drip pan as shown in Figure 7.

Figure 8 is another alternate embodiment of the drip pan control.

Figure 8a is a detailed vertical section through the device for tilting the drip pan as shown in Figure 8.

Figure 9 is an elevation, partly in section, of the extractor showing the means for totally enclosing it during the period of extraction also means for introducing steam and means for gauging the color.

Figure 10 is a horizontal section taken on the line X—X of Figure 9.

Figure 11 is an elevation with the cover removed of the new and improved means for the operation of the charging and gyration control feature of the extractor.

Figure 12 is a plan view of charging control means.

Figure 13 is another elevation of the same.

Figure 14 is a sectional view of the drip pan holding solenoid of Figure 1.

Figure 15 is a front elevation of the double throw single pole mercury switch used on the water control.

Figure 16 is a horizontal enlarged section on the line XVI—XVI of Figure 1 showing the improved plow.

Figure 17 is an elevation of the improved plow or discharger.

Referring to the drawings there is shown, in Figure 1, a centrifugal extractor machine of the type commonly employed in separating liquids from a mixture of crystals and liquors commonly called a magma. A casing 20 encloses a perforated metal cylinder 21 with inturned flanges at both the top and bottom, and mounted on a shaft 22 journalled at its upper end in the bearing 23 supported by the bracket 24 from the mixer tank 25 and adapted to be rotated by the motor 26 through the pulleys 27, 28 and the belt 29. The pipe or spout 30 leads from the mixer tank 25 to the basket 21 for the purpose of charging said basket 21 with the fill mass or magma and has the gate 31 for controlling the flow therefrom. The gate 31 is adapted to be raised to open position by the upwardly extending rod 32 with fluid pressure such as compressed air applied to the piston 33 in the cylinder 34 above the tank 25 and to close by gravity when said fluid pressure is exhausted therefrom. The admission and exhaust of fluid pressure to the cylinder 34 is controlled by the electrically operated valve 36. The operation and circuits for this are fully described in my Patent No. 2,090,373 it being sufficient to say here that when the controller panel 35 (lower right corner in Fig. 1) regulates the motor 26 to the proper speed for the charging operation a switch associated with said panel 35 operates to open the valve 36 and admits air to the cylinder 34. When the charge in the basket 21 builds up to the proper thickness on the walls thereof the finger 37 is turned to such position by the wall of fill mass that a switch in the box 38 is opened and the valve 36 shuts off the supply of air and allows the cylinder 34 to exhaust and close the gate 31.

Similarly as in the disclosure of Patent No. 2,090,373, there is a valve 39 interposed in the air supply pipe 40 to the valve 36 which is operated by the interconnecting springs 41 to the gate operating rod 32 to control the initial height to which the gate rod 32 is raised by shutting off the air supply. It is advantageous first to open the gate 31 wide to assure a good flow of magma and to clear the spout 30 of any hardened accumulations. However, as soon as the flow becomes free the opening should be reduced so as not to charge the basket 21 too fast. For this purpose a small hole or port 42 is provided partway up the side of the cylinder 34. This allows the air to escape from the cylinder 34 until the port 42 is covered by the piston 33 the same as in my former patent. Theoretically the gate 31 should now remain in this position until the valve 36 acts to exhaust the remaining air from the cylinder 34. However, in practice it has been found that although when the equipment is new this will operate satisfactorily in this manner, when the piston 33 and cylinder 34 or the valve 36 become worn additional air will escape and the gate will close further allowing the springs 41 to open the valve 39 again with the result that the gate 31 is once more opened wide. If this occurs just before the basket 21 is nearly full it will receive an overcharge or be caused to receive an uneven charge making it spin off center. The valve 39 has therefore been somewhat changed in construction as will be seen by referring to Figure 3. The plunger 43 thereof has the small hole 44 drilled down its center which as is evident will allow a small amount of air to pass through the valve even when the disc 45 of the plunger 43 is tightly seated. This hole should be of sufficient size to supply any except a serious leakage of the piston 33. The port 42 must be sufficiently large so that air will escape more quickly from the cylinder 34 than it is supplied by the hole 44 of the valve 39 in order to allow the piston 33 to settle after the initial opening thereof. As soon as it settles down to the port 42 it can settle no further due to the constant supply of air through the hole 44 of the valve 39.

The objection in the method disclosed in my Patent No. 2,090,373 is thus seen to be that while in the said former patent the port 42 was depended upon to allow the piston 33 to settle and, when the port was covered by the piston 33, to maintain it at this position by the air remaining below it in the cylinder 24, this does not happen if air escapes past the piston 33 or around the rod 32 where it enters the cylinder 34 but the piston 33 will continue to settle even though this leakage be very small. With the present improvement the air allowed to enter the cylinder 34 by means of the hole 44 in the plunger 43 of the valve 39 offsets any leakage which might occur due to wear and the piston 33 must always settle back to the same position regardless of such leakage or variation in supply pressure. Maintenance costs and lost time due to shut downs for repairs or overhauling of equipment are thus reduced to a minimum since parts need not be replaced until they become very badly worn.

The charger and gyration control switch box 38, shown in detail in Figures 11–13, is an improvement over the charger switch box disclosed in Patent No. 1,921,446 in that it has been simplified and the mode of adjustment thereof facilitated. The base 270, in use, is secured to the inturned upper edge of the centrifugal machine casing and has the shafts 221 and 222 journaled therein and extending downward into the basket 21. The shaft 222 is shorter than the shaft 221 and has the blade 223 secured in the slot 224 by the set screws 225 and the screw 226. The length of the shaft 222 is such that the center of the blade 223 is opposite the inturned upper edge of the basket 21. The shaft 221 has the blade 37 secured at its lower extremity in the same manner by the set screws 227 and the screw 228. The upper ends of the shafts 221 and 222 extend up into the box 38 and have the levers 229 and 230 respectively secured to the upper ends thereof by the set screws 231 and 232 (Fig. 12). The springs 233 and 234 act to maintain the respective levers 229 and 230 normally in contact with the stops 235 and 236 and are secured to the lugs 237 and 238 of the base 270. The springs 239 and 240 connect the levers 229 and 230 with the switch arms 241 and 242 respectively which are free to rotate on their respective shafts 243 and 244 in turn journaled in the levers 245 and 246. The torsional springs 247 and 248 act to turn switch arms 241 and 242 in such a direction that the springs 239 and 240 are maintained taut but the strength of said springs 247 and 248 is not sufficient to stretch the springs 239 and 240. The levers 245 and 246 are supported by the shafts 249 and 250 journaled in the posts 251 and 252 of the base 270. The upper ends of the levers 245 and 246 have the springs 253 and 254 attached thereto and fastened at their lower ends to the lugs 255 and 256 of the posts 251 and 252 respectively. Said springs 253 and 254 act to turn the levers 245 and 246 in such a direction that the lower ends thereof are maintained in contact with ends of the adjusting screws 257 and 258 which are threaded into the raised portions 259 and 260 of the base 270 and have the knobs 257a and 258a formed on the ends thereof. The knobs 257a and 258a have teeth formed in the rim thereof which engage with the springs 261 and 262 fastened to the base 270 to prevent any shifting of the setting due to vibration.

The switch arm 241 carries the switch clip 263 which is adapted to hold a switch of the tiltable mercury type. With the basket 21 empty and the lever 229 against the stop 235 the switch is put in the clip 263 so as to be in closed circuit position. This is the switch which is interposed in the circuit of the charger air valve solenoid 175 (Fig. 1). As the sugar builds up due to centrifugal force on the side of the basket 21 the blade 37 rides on the surface of the sugar turning the shaft 221 and the lever 229. Since, as explained above, the spring 239 is relatively strong the switch arm 241 is turned about the shaft 243 against the action of the torsion spring 247 until the switch arm 241 is vertical and the switch and clip are horizontal. The mercury then flows away from the contacts and opens the switch thus shutting off the air to the cylinder 34 and closing the charging gate 31. If it is desired to increase the charge in the basket 21 the switch in the clip 263 must not open until the blade 37 has moved to a position further away from the wall of the basket 21. If the original or normal tilt of the switch arm 241 is made greater then the blade 37 will have to turn further to bring said switch arm 241 finally to a vertical position in order to open the switch. Since the spring 239 is fastened to the switch arm 241 very nearly at the axis of rotation of the lever 245 it is seen that when the screw 257 is screwed further out, thus changing the angle of said lever 245, that the angle of the switch arm 241 will also be shifted in the same manner thus increasing the final charge in the basket. Conversely if the screw 257 is screwed further in, the original tilt of the switch arm 241 will be decreased and the blade 37 will not have to move so far to open the switch. The blade 37 is made fairly wide so that when the basket 21 is rotating at high speed the blade 37 will be held slightly away from the wall of sugar by the force of the air carried around by the basket thus preventing excess wear of the tip thereof.

The switch arm 242 carries three switch clips 264, 265 and 266, which are designed to hold switches for safety devices. If for any reason the basket 21 becomes charged unevenly it will rotate off center and if this off center rotation becomes too great when the machine is brought up to speed the vibration is likely to damage the bearings 23 or in extreme cases even to cause the basket to fly to pieces due to the uneven strains produced. It is extremely important in a fully automatic machine where an attendant is only occasionally present to prevent this and sound an alarm. If the basket 21 rotates off center, the rim thereof will bear against the blade 223 and cause the switch arm 242 to be turned in the same manner that the sugar operated the blade 37 to turn its switch arm 241. The switch of the clip 264 is normally closed and when the basket 21 gyrates it operates to interrupt the circuit of the pilot motor 87 (Figure 1) so that the controller cannot operate to accelerate the machine or the switch may be made normally open and used to close the reverse circuit of the pilot motor to bring the machine to a stop. The switch of the clip 265 is normally closed and operates to open the circuit of the solenoid 175 (Figure 1) for the charging air valve and thus cause the gate 31 to close and prevent further charging. The switch of the clip 266 is connected in the circuit of an alarm device, such as a bell, horn or red light and when the basket 21 gyrates it closes and sounds the alarm. The knob 258a is used to adjust the control to the amount that it is considered safe to allow the basket 21 to spin off center before the switches operate. The terminal block 267 is fastened to the raised portions 259 and 260 of the base 270 and is fastened thereto by the angles 268. The terminals 269 are adapted for making connections from the leads of the switches on the arms 241 and 242 to the wires which lead from the box 38 to the various parts of the apparatus.

A further improvement consists in the construction of the drip pan 46 (Figure 1) provided below the spout 30 and the improved method of control therefor. If additional material were allowed to drip from the gate 31 and the spout 30, into the basket 21 during the period that it is being spun at high speed to separate the liquor from the crystals or after the wash water has been applied this additional material would not be fully purged of its liquor thus lowering the quality of the product and requiring additional processing in the succeeding operations of the refining. It might be thought that any such leakage could be prevented by having the gate 31 fit very tightly against the face of the spout 30 but due to the abrasive qualities of the mixture of crystals and liquor the gate 31 and the face of the spout 30 soon become worn and it is virtually impossible to maintain a tight fit. Also the hard crystals get between the edges of the gate 31 and the face of the spout 30 allowing the thin liquor to leak out due to the pressure from above. It is, therefore, necessary to provide some means of receiving this leakage and of preventing it from getting into the basket 21 except at the proper time.

For this purpose, I have provided a drip pan 46 positioned under the spout 30 and extending somewhat more than the width thereof. The studs 47 (Figure 4) are fastened to the sides of the pan 46 and are journaled in the pedestal bearings 48 fastened to the top inturned flange of the casing 20 (Figure 1). This then forms a support for the pan 46 and allows it to be tilted about the axis of said bearings 48. The pan 46 is connected by the chain 49, fastened at the side thereof, to the arm 50 fixed on the gate operating rod 32. A spring 51 is interposed in said chain 49 at the upper end thereof. Another chain 52 also fastened to the side of the pan 46 connects it to the plunger 53 of the solenoid 54 which in turn is suitably fastened to the side of the spout 30. The upper end of the plunger 53 (Figure 14) has the rod 55 extending upward through the solenoid casing 54 and carrying the compression spring 56 restrained at the upper end thereof by the nut and washer 57 and bearing at its lower end against the solenoid casing 54. The strength of the spring 56 and the power of the solenoid 54 are so proportioned that they do not exert sufficient force to lift the weight of the pan 46.

However, when the gate 31 is raised by the gate rod 32, the chain 49 fastened to the gate rod 32 tilts the pan and relieves the tension in the chain 52 and the spring 56 lifts the solenoid plunger 53. As the electrical circuit, described hereinafter, is at this time closed the solenoid 54 is energized and pulls the chain 52 taut. Since when the plunger 53 is in its upper position the solenoid 54 has sufficient force to support the weight of the pan 46, said pan 46 therefore remains in its tilted position even after the gate closes and the chain 49 becomes slack thus allowing the accumulated drippings to drain out into the basket 21. The electrical circuit for the solenoid 54 is as follows:

The wires 58 and 59 connect said solenoid 54 to the supply or line wires 60 and 61 (Figure 1), the wire 59 having the switch 62, which is of the tiltable mercury type, interposed therein. The switch 62 is swingingly supported at the high speed end of the driving motor 26 controller panel 35 by the pivoted arm 63 said arm 63 being so positioned in relation to the finger 64 carried by the controller bridge 65 that said finger 64 tilts the switch 62 to open circuit position when the controller bridge 65 reaches high speed position. The solenoid 54 is thus deenergized allowing the pan 46 by virtue of its weight to return to the position shown in Figure 1.

The embodiment of the drip pan 46 shown in Figures 1, 4 and 5 has a cleanout scraper 66 which is operated through the piston rod 67 by the piston 68 in the small air cylinder 69. The air cylinder 69 also acts as a counterweight to tilt the pan 46 back to its normal position when the solenoid 54 is deenergized. When compressed air is supplied through the hose 70 the piston 68 is forced against the normal bias of the spring 71 towards the drip pan 46 thereby pushing the scraper 66 to the front or lip 46a of said drip pan 46 thus cleaning it of all accumulations. The pressure is then slowly released through the port 72 and the spring 71 returns the scraper 66 to the back of the pan 46.

In the embodiment shown in Figure 1 the cylinder 69 is connected by the flexible hose 70 and the pipe 73 to the exhaust port of the charging control valve 36. It is, therefore, seen that when the charging air cylinder 34 exhausts that this exhaust air will operate the scraper 66 and clean the drip pan of any accumulation which fails to drain out or any magma which dropped on the pan when the gate closed.

In Figure 7 an alternate embodiment of the tilting control for the drip pan 46 is shown wherein a small air cylinder 74 is used to tilt said drip pan 46 instead of the linkage to the gate rod 32 and the electric solenoid holding coil 54. In this case a pipe connection 75 is made from the cylinder 74 to the air supply line 40a to the charging air cylinder 34. A check valve 76 is interposed in the pipe 75 which allows air to be supplied to said cylinder 74 but not to be exhausted therefrom. A small aperture exhaust port 77 is provided for the cylinder 74 so that air will escape very slowly.

In operation as soon as air is supplied to the charging air cylinder 34 it is thus also supplied to the air cylinder 74 and the piston 78 is raised thus tilting the drip pan 46 by means of the rod 79 and the chain 80. In the case where the material being processed is not of a heavy nature the scraper 66 is not necessary and the material will drain out sufficiently when the pan 46 is tilted. In this case a small counterweight 81 is provided to return the pan 46 to its normal position. When the air cylinder 34 is exhausted the check valve 76 closes preventing escape of air from the cylinder 74 through the pipe 75. The drip pan 46 thus remains tilted until the air is finally exhausted through the small port 77. This port 77 may be adjustable and the time that the pan 46 remains tilted thereby regulated to the desired value.

In Figure 8 another alternate embodiment of this drip pan 46 tilting control is shown wherein a small air cylinder 82 similar to the cylinder 74 is employed but differs in that the piston rod 79' extends through the top of said cylinder 82 and is connected by a spring 83 to the arm 84 of the gate operating rod 32. When the gate rod 32 raises, the piston 78 is thus raised to the top of the cylinder 82 and air is drawn in through the check valve 85. When the gate 31 closes the tension is relieved from the spring 83 and the drip pan 46 tends to tilt back to normal position. However, the check valve 85 now closes and the air may only escape slowly through the small opening 86. This may be made adjustable so that the time that the pan 46 remains tilted can be regulated.

After the machine has been charged the pilot motor 87 is started as described in my copending application Serial No. 135,879, filed April 9, 1937, and the controller bridge 65 moves toward high speed position accelerating the motor 26 to full speed as described in my copending application Serial No. 229,084, filed September 9, 1938. While the basket 21 is being accelerated to high speed, the centrifugal force acting on the mixture of liquor and crystals in said basket 21, increases and the liquor is forced through the small perforations in the walls of the basket 21 and drops down around the inner wall of the casing 20 into the gutter 88 formed by the curb 89 (Fig. 1). From there it flows through the pipe 90 and into the funnel 91 mounted on the lever 92. The lever 92 is fulcrumed on the casing 93 and has the switch 94 mounted at its opposite extremity. The weight of the liquor in the funnel 91 overcomes the bias of the tension spring 95 and it is depressed thus tilting the switch 94 to open circuit position. As soon as the liquor has all been extracted from the sugar in the basket 21 no more liquor is supplied to the funnel 91 and the liquor in the funnel drains out thus allowing the spring 95 to return the lever 92 to its normal position, again closing the switch 94. The purpose of the switch 94 in combination with the funnel 91 is to determine the proper moment for the application of the wash water. After the bulk of the liquids have been extracted from the crystalline mass it is the practice to spray a measured amount of water into the machine in order to wash any adhering syrup from the surface of the crystals. It is important that this water be applied at precisely the correct moment. If applied too soon, that is, before the syrups have been extracted it merely dilutes the syrup to some degree and unless an excessive amount is applied does not wash the crystal. If applied too long after the syrups have been purged out then the remaining film of syrup on each crystal will have dried and hardened due to the circulation of air and connot be readily washed off. As is seen from the above description, when the syrup ceases to flow into the funnel 91 the spring 95 tilts the arm 92 and the switch 94 is closed.

Referring to Figure 2 the circuits for this control are shown. The switch 94 is used in conjunction with a timer to regulate the amount of water applied. This timer is an improvement over the timers disclosed in my Patents Nos. 1,939,183 and 1,939,185 in that only a single solenoid is required and is further simplified as will become apparent from the following description. When the switch 94 closes it completes a circuit from the 240 volt tap 60 through the wire 96 to the feed segment 97 on the controller panel 35 through the contact finger 98 of the travelling bridge 65, and through the jumper wire 99 to the contact finger 100, which, since the bridge 65 is at this time at or near the high speed, or right hand end of the panel 35, is therefore in contact with the segment 101, and thence from segment 101 through the wire 102 to the switch 103. The switch 103 is mounted on the smooth end portion of the screw 104 in such a manner that it frictionally engages said smooth portion and when the bridge 65 is accelerating or at high speed is in closed circuit position and when decelerating is in open circuit position. The details of such a switch mechanism are disclosed in my copending application Serial No. 135,879, filed April 9, 1937. The circuit from wire 102 to wire 105 is therefore closed and current passes to the wire 106, then through the switch 94, the wire 107 and the wire 108 to the solenoid coil 109. From the solenoid coil 109 the circuit is through the wires 110, 111 and 112 to the other side of the line 61. The solenoid 109 is therefore energized and the plunger 113 is pulled in. This has two effects. First the switch 114 which is supported by the member 115 loosely journaled on the shaft 116 is tilted to closed circuit position by the spring connection to the plunger 113. Secondly the member 117 is tilted until the gear 118 meshes with the gear 119. Due to the angle of the switch 120, which is normally closed, this tilt is not sufficient to put it in open circuit position and this therefore closes the circuit from the 240 volt line 60 through the wire 96 to the segment 97 and thence through the fingers 98, 100 and the jumper 99 to the segment 101, the wire 102, the switch 103, the wire 105, said switch 114, the wire 107, 133, the switch 120, the wires 134, 135 to the water solenoid 136, thence through the wires 137, 111 and 112 to the other side of the line 61. The solenoid 136 therefore is energized and opens the valve 138 interposed in the water supply pipe 139 and water is sprayed from the nozzle 140 into the basket 21.

Another parallel circuit is also closed from the wire 133 to the solenoid 142 and thence through the wires 143, 110, 111 and 112 to the other side of the line 61. The solenoid 142 (Fig. 1) is thus also energized and shifts the plate 141 by means of the lever 144 and the rod 145 so that the liquor from the pipe 90 is diverted into the gutter 146 instead of the gutter 147. This allows the high grade syrup, which will now come from the basket 21 as the sugar is washed, to be separated from the low grade syrups and molasses which was previously extracted therefrom. When the solenoid 142 is deenergized the spring 271 returns the plate 141 to its normal position.

Although the shaft 116 (Fig. 2) is free to rotate in the member 117, the gear 121 is keyed to said shaft 116 which is continuously driven by the constant speed motor 122 through the worm 123 and the worm gear 124. Therefore, when the member 117 is tilted by the solenoid 109 the gear 118 which rotates continuously is brought into mesh with the gear 119 and it is also rotated until the gear 118 drops into the cut-away portion of the gear 119. The angle of the switch 120 is such that the additional tilt produced by the gear 118 dropping into the cut-away part of the gear 119 is sufficient to put said switch 120 into open circuit position. As is evident, the interval of time between the meshing of the gears 118 and 119 and the opening of said switch 120 depends on the position of the cut-away portion of the gear 119 in relation to the gear 118. Since both the gear 119 and the worm gear 128 are free to rotate on the shaft 131, the spring 125 thus acts to keep the finger 126 of the gear 119 against the finger 127 of the worm gear 128, and it is seen by rotating said worm gear 128 by means of the worm 129 and the knob 130 that this time may be varied at will. Also since the amount of water sprayed into the basket 21 is a direct function of the amount of time between the closing of switch 114 and the opening of switch 120, the scale 132 fastened to the worm gear 128 may be calibrated directly in gallons or quarts of water.

In the event, due to either a mechanical or electrical failure of this water control, that the solenoid 136 is not energized to turn on the water it is desirable that the machine be prevented from discharging its load of unwashed sugar. In the present case where all the functions of the machine are automatic and no operator is present to supervise said operations, it is very likely that several unwashed charges would be discharged before this would be noticed. This not only results in a bad product from the single machine but since all the machines in the group discharge into a common conveyor it reduces by a severe amount the effectiveness of all the other machines in the group. I have therefore provided an electrical interlock between the motor 148 which operates the plow 279 and the water solenoid 136 by means of the relay 149.

The relay 149, shown in the center of the diagram in Fig. 2, consists of the coil 149 which operates to close the contacts and the coil 149a which operates the latch 150 to release the armatures 151 and 152 and open the contacts. When the coil 149 is energized, the armatures 151 and 152 close the contacts and the latch 150 swings into place over the ends of the armatures 150 and 151 thus maintaining the contacts in closed circuit position even though the coil 149 is again deenergized immediately. When the coil 149a is energized the latch 150 is disengaged from the armatures 151 and 152 allowing the contacts to open. This coil 149a need only be energized momentarily in order to open said contacts.

In operation when the wash water solenoid coil 136 is energized the relay coil 149 is also energized through the wire 135, the switch 214, which as later explained is closed at this time, and wires 216 and 137 thus closing the contacts. This closes a circuit from the line wire 61 through the wires 153 and 154 to the armature 152 and thence through the wire 155, the switch 156, which is so positioned in relation to the controller bridge 65 that it is closed when the machine is at plowing speed, then through the wire 157 to the plow motor 148. It is therefore seen that if the water solenoid 130 is not energized the relay 149 will not close and the plow motor 148 will not be energized and will thus not lower the plow 37 into the basket 21. Since some kinds of sugar have a grain structure such that they will not remain on the side of the basket 21 when it is brought to a stop the circuit for the dynamic brake resistor 158 (Fig. 2) is also opened to prevent the driving motor 26 from being brought to a full stop. The operation of this resistor 158 is fully described in my copending application Serial No. 229,084, filed September 9, 1938. The opening of this circuit is accomplished by interrupting the circuit from the contactor control segment 159 through the wire 160 to the relay armature 151 which ordinarily connects the segment 159 through the wires 161 and 162 to the contactor coil 163. This contactor coil is thus prevented from closing the contact 164 which connects the motor 26 through the wires 165, 166, 167, the segment 168, the finger 169, the jumper wire 170, the finger 171, the segment 172 and the wire 174 to said resistor 158.

In order to open the relay 149 again the coil 149a thereof is shunted across the solenoid coil 175 for the charging air valve 36 by the wires 176 and 177 so that when this solenoid 175 is energized the coil 149a will also be energized and release the latch 150 and thus open the contacts.

A still further precaution against the basket discharging unwashed sugar is provided by the automatic gates 180 and 181 (Fig. 6) provided under the basket 21 to cover the conveyor 182. Said gates 180 and 181 are positioned to slide and be guided by the parallel members 183 and 184. The gate 180 is attached to the piston rod 185 of the air cylinder 186. The gates 180 and 181 have the arms 187 and 188 which are interconnected by the springs 189 tending to draw the gates together over the conveyor 182. The ropes 195 or other flexible connecting means are fastened at one end to the arms 187 and thence pass around the pulleys 190 and are fastened at the opposite end to the arms 188. It is thus seen that when fluid pressure such as air is applied to the cylinder 186 the gates will be separated and moved away from over the conveyor 182. The air supply to the cylinder 186 is under the control of the three way air valve 191 which is operated by the solenoid 192 to admit air from the supply pipe 193 to the cylinder 186 or to exhaust air from the cylinder 186 through the exhaust port 194.

The solenoid 192 is energized from the same wire 157 (Fig. 2) as the plow motor 148 and can therefore operate to open the gates 180 and 181 only when the machine is at the plowing speed as the switch 156 is always open at other times, and only when the no water relay 149 is closed. It is thus seen that even if some unwashed sugar does escape from the basket 21 such as when the machine is charging it cannot get into the conveyor 182. If so desired the solenoid 192 may be controlled by a relay separate from the relay 149 so that even if the one relay fails the other will operate alright.

An improvement over the means for accelerating and decelerating the driving motor 26 as described in my copending application Serial No. 229,084, filed September 9, 1938, is provided by the relay 197 (center of diagram in Fig. 2) which is designed to keep the current in said driving motor substantially constant regardless of variations in the load or other factors. As explained in the above mentioned copending application the speed of acceleration or deceleration of the motor 26 depends on the speed with which the pilot motor 87 drives the travelling controller bridge 65 across the panel 35. If the pilot motor 87 drives the bridge 65 fast then the driving motor 26 will draw more current since the current varies approximately as the square of acceleration. If the machine is allowed to accelerate too rapidly it is therefore seen that it will draw excessive amounts of current and conversely if accelerated too slowly will not be at maximum efficiency and will waste valuable time. The coil 197 of this relay consists of a few turns of heavy wire and is in series with the armature of the motor 26, being interposed between the conductors 165 and 166. It is of the normally closed type and the contacts 198 with the wires 199 and 200 form a shunt around the resistor 201 which is in series with the armature lead 202 of the pilot motor 87. In operation when the current in the driving motor gets high the current in the coil 197 becomes sufficient to open the contacts 198 and thus remove the shunt around the resistor 201 and the pilot motor 87 slows down which reduces the rate of acceleration of the driving motor 26 thereby decreasing the current and allowing the relay 197 to close again. In practice it is best to have the pilot motor 87 travel at a speed slightly in excess of that for the ideal rate of acceleration and the relay 197 will therefore be constantly operating to speed it up and slow it down again thus keeping the current in the main motor 26 near rated values and within close limits.

Some types of sugars cannot be properly treated in centrifugal machines operating at normal speeds and due to their special grain structure must be treated in high speed machines. However, after making many tests, it has been found that unless the rates of acceleration are greatly increased in order to keep the total time of acceleration substantially the same the increase in efficiency of the high speed machine over the slow speed machine is negligible. In order to increase the rate of acceleration, it is ncessary to provide motors of a greatly increased power since the power varies approximately as the square of the acceleration. In a new plant this means a much larger capital outlay and increase maintenance costs and if an existing plant is being changed over means that all the motors must be replaced by motors of a larger capacity. The reason that the gain in efficiency of purging the liquor is not realized unless the rates of acceleration are increased is due to the fact that by the time the basket is accelerated to speed the air passing through the sugar has dried a large portion of the liquor on the surface of the crystals. When this has happened, no matter how high the speed is made, further separation is practically impossible.

Referring to Figures 9 and 10, I have illustrated a means of obviating this difficulty without resorting to larger motors to increase the acceleration. This consists of two main features. First the centrifuge is totally enclosed to minimize the circulation of air through the sugar in the basket 21, and secondly, a connection 203 is provided for introducing steam into the basket 21. By maintaining a flow of steam into the basket 21 the air is expelled therefrom and the steam passing through the cooler crystals of sugar is condensed keeping the sugar damp and heating the liquor thus reducing its viscosity. Normally the liquor is cooled and dried increasing its viscosity and making it more difficult to separate from the crystals. By this means the liquor is maintained in a liquid state and the full benefits of the high speed are realized to an even greater extent than by increasing the rate of acceleration. Other benefits are realized in that less wash water need be used thus reducing the dissolving of the crystals due to washing and thereby increasing the yield of crystals from the machine over that of conventional methods. By using this method the magma need not be heated in the mixer 25 thereby further reducing the dissolving of the crystal and producing further crystallization of the mother liquor in the mixer. This is permissible due to the fact that the steam acts on the surface liquor of the crystal rather than heating the entire crystal and liquor. By this method the heat loss is therefore reduced to a minimum and the thermal efficiency obtained is far above that of the system where the magma is heated in the mixer.

Further advantages of the use of steam, in addition to the increase in efficiency of the processing, are realized in that the working parts of the plow 279 such as the plow guide rod 285 (Fig. 17), the spring 286 which operates it, the plow torsion spring 287 and the plow shaft 277 are kept free of accumulations of hard sugar which would impede their free operation. The heat of the steam and the condensation of moisture therefrom acts constantly to dissolve and dislodge any accumulations which tend to form on these parts. This also applies to the shafts 221 and 222 of the charger switch box (Fig. 13) and all other apparatus in the basket. The perforations of the basket 21 are also kept more free and clear allowing the liquor to pass through more readily than when the steam is not used as the screen is thoroughly cleaned by the steam each time after the machine discharges. Also the sugar is kept moist and soft thus facilitating its discharge from the basket 21 in both the case where a mechanical discharger, such as shown, is employed or where the self discharging type of basket is used.

Referring again to Figs. 9 and 10, the casing 20 of the machine is entirely covered over by the cover 204 which is formed to fit closely around the charger control box 38, the shaft 22, water pipes, steam pipes and so forth. In order to permit charging of the basket 21 the cover 204 has an open space on the side near the spout 30 with the triangular walls 204a which have the narrow flange 204b at their lower edges. The drip pan 46' is somewhat longer than the drip pan 46 of the previously described forms and fits closely to the inturned upper edge of the casing 20 at the bottom and when turned up fits closely against the top of the cover 204 along its lip and against the flanges 204b of the side walls 204a along both sides thereby completely sealing the opening in the cover 204. It is journaled at the side walls of the cover 204 and when the back thereof is raised by the chain 49 it tilts into the basket 21 and the sugar flows through the opening in the cover 204 into the basket 21 as indicated by the broken lines. It is returned to normal position by the counterweight 213.

The steam is applied through the pipe 203 and flows into the basket 21 through the nozzle 205 which may be the same nozzle through which the wash water is applied. The flow of steam is regulated by the valve 206. When raw sugar is being processed the steam is applied continuously but on refined sugar is cut off before the basket 21 is decelerated.

In order to indicate the color of the sugar which is an indication of the efficiency of the separation a photoelectric cell 207 is suspended in the basket 21 by the conduit 208 and is connected with the meter 209. A constant light source 210 is supplied with energy from a suitable source through the wires 211 and 212 and shines on the surface of the sugar. The amount of light reflected to the photoelectric cell 207 and the reading on the meter 209 indicates the color of the sugar. If the sugar is poorly washed it will be darker and will not reflect so much light thus giving a lower reading on the meter 209. A recording meter could be substituted for the meter 209 thus giving a continuous record of the machine. Also a contact making instrument may be employed to give an alarm by means of a light or a bell.

In treating some types a long cycle is necessary in order to effect the separation of the crystals and liquor properly and by the time the machine is decelerated for the discharging operation the surface of the sugar in the basket becomes quite dry and hard. This is especially true where steam is not used to keep the sugar moist. This results in considerable difficulty in plowing out the basket 21 and causes frequent breakage of the plow 281. In order to soften the sugar just before it is plowed out I have provided the swingingly suspended switch 214 (Fig. 2) which is supported in the path of the finger 215 on the bridge 65 and is connected in the circuit so as to momentarily energize the water solenoid 136 and apply a small amount of water to the surface of the sugar in the basket 21 as it is closed by the finger 215 while the machine is being decelerated to plowing speed. In order to prevent the relay coil 149 from resetting in case the water has previously failed to spray the switch 214 is provided with contacts in both ends and the middle as shown in Figure 15. When in its normal position the contacts 217 and 218 are closed thus closing the circuit through the wires 135 and 216 to the closing coil 149 of the no water relay. However, when the switch 214 is tilted by the finger 215 on the bridge 65 so that the contacts 218 and 219 are closed the contacts 217 and 218 are open and the relay coil 149 is not energized. The circuit for applying the water just before plowing is from the 240 volt supply wire 60 through the wire 220 through the switch 214, the wire 135, the water solenoid 136 and to the opposite side of the line 61 through the wires 137, 111 and 112.

The plow for discharging the basket 21 is an improvement over the plow disclosed in my Patents No. 1,992,629, and No. 2,077,053, being made up in sections, the purpose thereof being to make said plow more flexible to absorb shocks due to hitting hard lumps of sugar and provided with shearing screws which are designed to break if the plow gets caught on a hard object in the sugar or goes into the basket at high speed. Very often in the centrifuging of raw sugars pieces of wood, metal, etc., get in with the sugar and if the plow gets caught against one of these foreign objects, unless shearing screws are provided, the plow will dig into the perforated brass screen, with which the basket 21 is lined and tear it. The plow, as shown in Figs. 16 and 17, consists of the casting 275 which has the lugs 276 into which the bottom of the plow shaft 277 fits, said casting 275 being prevented from falling off the shaft 277 by the pin 278, the flexible steel plate 279 is fastened to the casting 275 by relatively light brass screws 280. The plow tip 281 which bears against the inside of the basket 21 to scrape the sugar therefrom is made of fibre and may be replaced when worn. It is fastened to the plate 279 by screws 282. Light shocks such as are caused by hard lumps of sugar will be absorbed by the springiness of the plate 279 but if the tip 281 strikes an unyielding object the screws 280 shear off and may easily be replaced, which is preferable to having the screen on the inside of the basket 21 torn.

It is obvious that various changes and modifications may be made in the details of construction and design of the above specifically described embodiment of this invention without departing from the spirit thereof, such changes and modifications being restricted only by the scope of the following claims.

What is claimed is:

1. In a feeding device, a source of feeding liquid, a receiver for the liquid, a valve for controlling the admission of liquid from said source to said receiver, means for operating said valve, a drip pan movably mounted and biased to lie normally below the valve to prevent drippings from said valve from entering the receiver in one position of its movement and in another position of its movement being removed from below said valve to provide for unobstructed flow from said valve to said receiver, means cooperating with said valve operating means for moving said drip pan out of drip-catching position when said valve is open, means for holding said drip pan out of drip-catching position, operating means for opening and closing said valve, and time delay means operatively associated with said valve operating means and with said holding means for releasing said holding means to allow said pan to return to drip catching position a predetermined length of time after said valve has been closed by said valve operating means.

2. In a feeding device for a centrifugal extractor, a source of feeding liquid, a valve for controlling the admission of liquid from said source to the extractor, a drip pan pivotally mounted to lie normally between the valve and the extractor, means for swinging the drip pan out of the way when the valve is open, a spring biassing the drip pan to out of the way position, said spring being of a strength insufficient to hold or move said drip pan of itself, a solenoid for augmenting at times the force of said spring, the solenoid itself being unable to hold or move said drip pan but having a strength sufficient to augment the spring to hold the drip pan when the pan is in out of the way position and when the solenoid is energized, a driving motor for the extractor, a speed control for said motor, a switch for said solenoid normally closed to energize the solenoid, and means for opening said switch when the motor is at high speed, whereby the drip pan returns to normal position during high motor speed when the valve is closed.

3. In a feeding device, a source of feeding liquid, a receiver for the liquid, a valve for controlling the admission of liquid from said source to said receiver, a drip pan movably mounted and biassed to lie normally below the valve to prevent drippings from said valve from entering the receiver in one position of its movement, and in another position of its movement being removed from below said valve to provide for unobstructed flow from said valve to said receiver, a fluid operating means for said valve, means for introducing operating fluid into said means to open said valve, fluid operating means for moving said drip pan out of drip-catching position, a fluid conduit between said valve operating means and said drip pan operating means to supply operating fluid to said drip pan operating means simultaneously with the supply of operating fluid to the valve operating means, exhaust means for the fluid in said valve operating means to effect closure of the latter, means for exhausting fluid from said drip pan operating means, and control means to regulate the relative rates of exhaust of fluid from the valve operating means and drip pan operating means whereby the drip pan closes at a regulated time interval after said valve closes.

4. In a feeding device, a source of feeding liquid, a receiver for the liquid, a valve for controlling the admission of liquid from said source to said receiver, a drip pan movably mounted and biased to lie normally below the valve to prevent drippings from entering the receiver, a fluid operating means for said valve, means for introducing operating fluid into said means to open said valve, fluid operating means for moving said drip pan to out of the way position, a fluid connection between said valve operating means and said drip pan operating means whereby said drip pan is moved to out of the way position when said valve is open, and means for allowing fluid to escape gradually from said drip pan operating means after the valve operating means is exhausted of operating fluid whereby the drip pan slowly returns to its normal position after the valve is closed.

5. In a feeding device, a source of feeding liquid, a receiver for the liquid, a valve for controlling the admission of liquid from the source to the receiver, a drip pan movably mounted and biassed to lie normally below the valve to prevent drippings from entering the receiver, an operating means for said valve, a cylinder, a piston in said cylinder, means for raising the piston in the cylinder when the valve is in open position, a connection between the piston and the drip pan to move the drip pan to out of the way position when the piston is raised and the valve is open, and a retarding means connected to said cylinder comprising a check valve and a bleeder for retarding the return of the drip pan to normal position after the valve is closed.

6. In a feeding device, a source of feeding liquid, a receiver for the liquid, a valve for controlling the admission of liquid from said source to said receiver, a drip pan movably mounted and biassed to lie normally between the said source and receiver to prevent drippings from entering the receiver, operating means for said valve, means for moving said drip pan to out of the way position when said valve is open, and means for retarding the return of said drip pan to normal position after said valve is closed.

7. In a feeding device, a source of feeding liquid, a receiver for the liquid, a valve for controlling the admission of liquid from said source to said receiver, means for operating said valve, a drip pan adapted normally to lie between said source and receiver to prevent drippings from entering the receiver, cleaning means in said pan movable across said pan from one side thereof to the other, means normally biasing said cleaning means to one side of said pan, operative means for the cleaning means adapted to cause the latter to move to the other side of said pan against said biasing means, and means operatively connecting said valve operating means and said cleaning means operating means to actuate the latter when the valve closes.

8. In a feeding device, a source of feeding liquid, a receiver for the liquid, a valve for controlling the admission of liquid from said source to said receiver, fluid operated means for operating said valve, a drip pan adapted to lie normally between said source and receiver to prevent drippings from entering said receiver, a scraper in said pan for cleaning the same, fluid operated means for operating said scraper, and a connection between asid scraper operating means and the exhaust of said valve operating means whereby the scraper is operated when the valve operating means is exhausted to close the valve.

9. An extractor control comprising a casing, a shaft journalled in the casing, means for rotating said shaft responsive to extractor condition, an arm on said shaft in the casing, a stop in the casing, means biassing said arm against said stop, a lever rotatably mounted in the casing, an adjustable stop for said lever, means biassing said lever against said adjustable stop, a switch bracket rotatably mounted on said lever, spring means connecting the arm on said shaft with said switch bracket to rotate the bracket when the shaft is rotated, and a relatively weak spring connection between said lever and said switch bracket for resisting the tension of said spring means, the adjustable stop for said lever being adapted to increase or decrease the tension of said relatively weak spring to vary the degree of rotation of the shaft required to rotate the switch bracket.

10. A control for use with a motor driven centrifugal extractor and a feeding valve therefor comprising, a casing for mounting on a stationary part of the extractor, a pair of shafts journalled in the casing, means for rotating one of said shafts responsive to accumulation of material on the wall of the basket of the extractor, means for rotating the other of said shafts responsive to gyration of the extractor basket out of normal line, an arm on each of said shafts in the casing, means biassing said arms to predetermined positions, a pair of levers rotatably mounted in the casing, separately adjustable stops for said levers, means biassing said levers against said stops, switch means including brackets rotatably mounted one on each of said levers, spring means connecting said brackets with said arms to rotate one of the brackets when one of the shafts is rotated, and relatively weak spring connections between said levers and the respective switch brackets for resisting the tension of the respective spring means, the adjustable stops for said levers being adapted to increase or decrease the tension of said relatively weak springs to vary the degrees of rotation of the shafts required to rotate the respective switch brackets, said switch means connected to the shaft responsive to accumulation of material in the basket controlling the feeding valve for the extractor to close said valve when a predetermined quantity of material is in the basket, said switch means connected to the shaft responsive to basket gyration controlling the motor of the extractor to prevent further acceleration thereof and also controlling the feeding valve for the extractor to close the same when the basket gyrates a predetermined amount out of normal line.

11. In a motor driven centrifugal extractor, washing means for the material in the extractor, electrical means for operating said washing means at a predetermined time in the extractor cycle, a plow mounted for movement in the extractor to scrape extracted material therefrom, a motor for operating said plow, control means for said extractor motor including a dynamic resistor brake for decelerating the motor, a solenoid electrically connected to said washing operating means and energized therewith, a circuit for said plow motor including a normally open switch with an armature adjacent said solenoid, a second circuit for said dynamic resistor brake including a normally open switch with an armature adjacent said solenoid, both of said armatures being adapted to move to close the respective circuits when said solenoid is energized, a latch including an armature for holding the first said two armatures in closed position after they are closed by said solenoid, a second solenoid mounted adjacent the armature of said latch and adapted to release said latch when energized, and means for energizing said second solenoid at the beginning of each extracting cycle, whereby said plow motor and said resistor brake cannot operate until said washing operating means operates.

12. In a centrifugal extractor, a plow for removing extracted material from the extractor, a motor for operating the plow, a circuit for controlling said motor, a receiver for the material removed by said plow, a cover movably mounted over said receiver for preventing entrance of material thereinto when said cover is in closed position, and an electrically controlled operator for said cover in the circuit of said motor whereby to close said receiver until said plow motor is controlled to operate said plow.

13. In a centrifugal extractor, a plow for removing extracted material from the extractor, a motor for operating the plow, a circuit for controlling said motor, a receiver for the material removed by said plow, a pair of covers slidably mounted over said receiver, means interconnecting said covers to cause them to move to and from one another when either one is moved, said means biassing the covers to closed position, electrically controlled means for moving one of said covers to cause them to move away from one another to uncover the receiver, washing means in the extractor for washing the extracted material therein, means in the said motor controlling circuit to prevent operation of the motor until the washing means has operated, the electrically controlled cover operating means being in the said motor controlling circuit whereby the covers remain closed until the washing means has operated.

14. A centrifugal extractor comprising, a frame a basket rotatably mounted in the frame, said frame and basket being open at the top for charging, a feeding spout terminating over the opening top of the frame and basket, a cover over the open top of the frame and basket and having a charging opening therein below said spout, and a drip pan movably mounted below said spout to operate in the charging opening of said cover and adapted to close said opening during extraction.

15. In a sugar extractor, a frame, a basket rotatably mounted in the frame, means for supplying magma to the basket for extraction, means in the basket for washing sugar after extraction from the magma, a constant light source in the basket shining on the sugar therein, a photoelectric cell mounted in the basket to receive reflected light from the sugar, and an indicator electrically connected to said photoelectric cell and located outside of the basket whereby an operator can determine the efficiency of the washing of the extracted sugar by the intensity of light reflected to the photoelectric cell.

16. A plow for use in a centrifugal extractor comprising a control rod, a base for swingably receiving the end of said rod, a flexible steel plate, connectors capable of shearing readily extending through said base and plate to dispose the plate radially of the control rod, and a contact strip secured to the end of said plate and adapted to engage the material to be plowed, whereby said connectors will shear off if the contact strip encounters an unyielding object.

17. An automatic centrifugal extractor comprising, a frame, a rotatable basket in the frame, a motor for said basket, a controller for operating said motor at various speeds in the extracting cycle, a pilot motor for said controller, a feed for said basket with a spout terminating thereover, a gate in said spout, fluid operating means for said gate to open the same widely at first and thereafter to allow the partial closing of the gate and including a constant restricted fluid supplying valve to compensate for leakage, a drip pan underlying said spout and mounted for movement into and out of the path of feeding, means for correlating the movement of the pan with the gate to move the pan out of the path of feeding when the gate is open and to move the pan into the path of feeding gradually after the gate is closed, means for controlling the gate operating means to prevent charging after a predetermined quantity of material is present in the basket and in the event of excessive gyration of the basket out of its normal line of rotation, means for controlling the rate of acceleration of the motor for the basket according to the load in said motor to prevent too rapid acceleration, means for collecting liquid from the extractor, means for washing the material in said basket, means for controlling the said washing means according to the amount of liquid collected from the extractor whereby to wash said material when it has reached a predetermined point of dryness, means for controlling the time of washing said material, two receivers for the liquid collected from the extractor, means for diverting said liquid to one or the other of said receivers, means for controlling said diverting means to divert extracted liquid to one receiver and washings to the other receiver, a plow for removing material from said basket, means for operating said plow, means for preventing operation of said plow operating means until said washing means has operated, a receiver for solid material plowed from said basket, a cover movably mounted over said receiver, means for operating said cover, and means for preventing said cover operating means from opening said cover until said washing means has operated.

18. In a centrifugal extractor, a rotatable basket, driving means therefor, charging means supplying material to said basket, plowing mechanism mounted for movement in said basket to scrape extracted material from the latter, means for operating said plowing mechanism, water applying means for spraying the extracted material in said basket with water, means for actuating said water applying means, and means controlled by said last named means for actuating said plowing mechanism operating means.

19. In apparatus of the class described, a centrifugal extractor, driving means therefor, means for supplying material to the extractor, means for receiving separated liquids from said extractor, conduit means for carrying off extracted liquids from said receiving means, flow determining means in said conduit means, and means actuated by said flow determining means for applying wash water to the material in said extractor when the flow of extracted liquids through said conduit means falls below a predetermined value.

20. In apparatus of class described, a motor-driven centrifugal extractor, means for supplying material to said extractor, a casing to receive separated liquids from said extractor, conduit means for the flow of liquids from said casing, means for applying wash water to the material in said extractor, valve means for controlling the application of wash water, timing mechanism adapted to close said valve means after a predetermined period, and flow determining means in said conduit means for opening said valve means and start the operation of said timing mechanism when the rate of flow through said conduit means falls below a predetermined value.

21. In apparatus of the class described, a centrifugal extractor, driving means therefor, means for supplying material to the extractor, means for receiving separated liquids from said extractor, conduit means for carrying off extracted liquids from said receiving means, means for applying wash water to the material in said extractor, electrically controlled valve means for said water applying means, a circuit for said valve means, a switch in said circuit movable to circuit-closing and circuit-breaking positions to open and close, respectively, said valve means, flow determining means in said conduit means operative to maintain said switch in circuit-breaking position when the flow of extracted liquids through said conduit means is above a predetermined value and to move said switch to circuit-closing position when the flow through said conduit means falls below said predetermined value, a normally closed second switch in said circuit, and electrically controlled timing mechanism in said circuit operated on closing of said first-named switch for opening said second switch after a predetermined period whereby to close said valve means.

22. In apparatus of the class described, a centrifugal extractor, driving means therefor, means for receiving separated liquid from the extractor, conduit means for the flow of liquid from said receiving means, means for washing material in the extractor, flow means including flow determining means for initiating the washing means at a predetermined rate of flow of liquid through said conduit means whereby to perform the washing at a predetermined stage of separation of liquid and extracted material, two adjacent receivers for discharged liquid, one for extracted liquid and the other for washings, a deflector plate pivotally mounted over the receivers for swinging to direct discharged liquid into either of the said receivers, means normally biasing said plate to direct liquid into the said one receiver, and means controlled by said flow determining for swinging said plate to direct liquid into said other receiver during the washing operation.

23. In apparatus of the class described, a centrifugal extractor, means for charging the extractor with a fill mass consisting of solids and liquids, means for rotating the extractor to extract the liquids from the solids, water applying means for washing said fill mass, operating means for said water applying means, means for collecting extracted liquids and washings, conduit means for discharging the liquids and washings from said collecting means, two receivers positioned below said discharge means, deflecting means positioned and normally biassed to direct extracted liquids from the discharge means into one receiver, actuating means for shifting said deflecting means against its normal bias to direct washings into said other receiver, flow determining means in said discharge means, and control means operatively associated with the flow determining means, said operating means and said actuating means so constructed and arranged that when flow of extracted liquids in the discharge means falls below a predetermined value the water applying means is initiated and the deflecting means is simultaneously shifted to direct washings into the second receiver.

JACOB J. NEUMAN.